US012748941B2

(12) United States Patent
Chakravarty et al.

(10) Patent No.: US 12,748,941 B2
(45) Date of Patent: Sep. 29, 2026

(54) ELECTRONIC TAGS FOR WEIGHING OBJECTS

(71) Applicant: Position Imaging, Inc., Portsmouth, NH (US)

(72) Inventors: Narasimhachary Nallana Chakravarty, Rollinsford, NH (US); Guohua Min, Exeter, NH (US); Edward L. Hill, Conway, NH (US)

(73) Assignee: Position Imaging, Inc., Portsmouth, NH (US)

( * ) Notice: Subject to any disclaimer, the term of this patent is extended or adjusted under 35 U.S.C. 154(b) by 0 days.

(21) Appl. No.: 19/250,254

(22) Filed: Jun. 26, 2025

(65) Prior Publication Data

US 2026/0004100 A1 Jan. 1, 2026

Related U.S. Application Data

(60) Provisional application No. 63/665,702, filed on Jun. 28, 2024.

(51) Int. Cl.
*G06K 19/077* (2006.01)

(52) U.S. Cl.
CPC .............................. *G06K 19/07758* (2013.01)

(58) Field of Classification Search
CPC ................................................ G06K 19/07758
See application file for complete search history.

(56) References Cited

U.S. PATENT DOCUMENTS

| | | | | |
|---|---|---|---|---|
| 7,265,302 | B2 | 9/2007 | Keech et al. | |
| 10,264,865 | B2 | 4/2019 | Jacob | |
| 11,107,337 | B2 | 8/2021 | Hill et al. | |
| 11,922,246 | B2 | 3/2024 | Hill et al. | |
| 12,011,073 | B2 | 6/2024 | Hill et al. | |
| 2006/0231297 | A1 | 10/2006 | Patel | |
| 2008/0074265 | A1 | 3/2008 | Schoen et al. | |
| 2015/0359460 | A1 | 12/2015 | Rubin et al. | |
| 2016/0189507 | A1 | 6/2016 | Rayner | |
| 2016/0328900 | A1 | 11/2016 | Yong et al. | |
| 2017/0220040 | A1 * | 8/2017 | London .................. | A45C 15/06 |
| 2017/0343409 | A1 | 11/2017 | Natarajan | |

OTHER PUBLICATIONS

"Weight Sensor IoT RFID/NFC TAG" Preliminary DataSheet, arfidex GMBH, 2021, https://www.arfidex.de/images/Downloads/arfid_HF_NFC_UHF_Weight_Sensor_IoT_TAG_Datasheet.pdf.
International Search Report and Written Opinion in PCT/US2025/035328 mailed on Oct. 15, 2025.

* cited by examiner

*Primary Examiner* — Jamara A Franklin
(74) *Attorney, Agent, or Firm* — Schmeiser Olsen, PLLC; Timothy P. Collins, Esq.

(57) ABSTRACT

An electronic tag coupled to a piece of luggage comprising a computer processor; a memory in communication with the computer processor, the memory storing inertial data; and at least one sensor that captures the inertial data of the motion of the luggage in response to an external stimuli and outputs the inertial data to the memory, wherein the computer processor determines a mass of the luggage from the captured inertial data.

20 Claims, 6 Drawing Sheets

ELECTRONIC TAGS FOR WEIGHING OBJECTS

CROSS-REFERENCE TO RELATED APPLICATION

This application claims priority to U.S. provisional application No. 63/665,702, filed Jun. 28, 2024 and entitled "Electronic Tags for Weighing Objects," the entirety of which is incorporated by reference herein.

This application is related to U.S. Pat. No. 11,922,246 titled "Article Identification and Location Device and Systems and Methods of Using Same," U.S. Pat. No. 11,107,337, titled "Article Identification and Location Device and Systems and Methods of Using Same," and U.S. Pat. No. 12,011,073 entitled "Article Identification and Location Device and Systems and Methods of Using Same," the entirety of each of which is incorporated by reference herein for all purposes.

FIELD OF THE INVENTION

The invention relates to systems, methods, and devices that are physically attached to objects for weighing objects without a weight scale.

BACKGROUND

There are many applications where there is a desire to determine the weight of an object without expensive, complicated, and bulky weight stations or the like. For example, airports currently rely on large weight scales to weigh luggage before it is placed on an airplane because of the airplane's fuel requirements and rules regarding luggage size and weight distribution inside the airplane.

SUMMARY

All examples and features mentioned below can be combined in any technically possible way.

In one aspect, the invention is related to a luggage tag comprising a coupling device or element for coupling the luggage tag to a piece of luggage; a computer processor; memory in communication with the computer processor, the memory storing inertial data; and at least one sensor that captures the inertial data of the motion of the luggage in response to an external stimuli and outputs the inertial data to the memory, wherein the computer processor determines a mass of the luggage from the captured inertial data.

In another aspect, an electronic tag comprises a coupling device or element for coupling a luggage tag to an object; a computer processor; memory in communication with the computer processor, the memory storing inertial data; and at least one sensor that captures the inertial data in response to a motion of the object and outputs the inertial data to the memory, wherein the computer processor determines a mass of the object from the captured inertial data.

In another aspect, a weight measuring system, comprises a wearable smart device comprising at least one sensor that captures impact and movement data of an object, the wearable smart device positioned on a user applying a force to the object; and a tag coupled to the object for registering the impact and movement as a consequence of the force applied by the user to the object.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
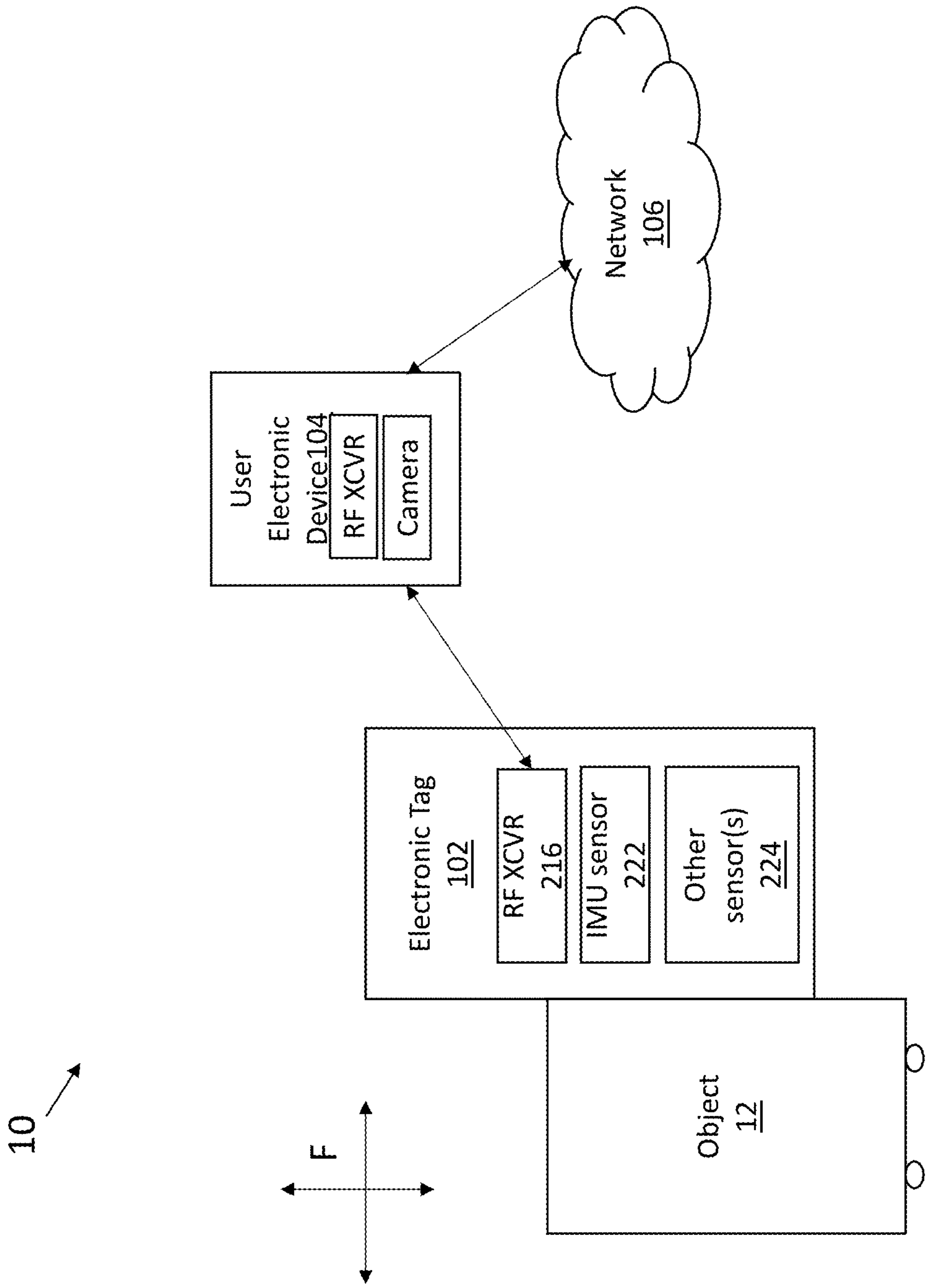
FIG. 1 illustrates a system for weighing an object, in accordance with some embodiments.

FIG. 1 illustrates a system 10 for weighing an object, in accordance with some embodiments. The system 100 can help users, for example, airline passengers with luggage 12 that is being checked into an airport or on an airplane. Often times these airline passengers check into flights from home by telephone or online and knowing the weight of their luggage before arriving at the airport can help speed up the check-in process and help the airlines better manage flights from advanced knowledge of cargo weight. The system 10 includes an electronic device 102 constructed to attach to an object such as the luggage 12, or other objects such as packages or any goods having a surface amenable for coupling with the electronic device 102 or embedded into the object. The electronic device 102 can be constructed as a tag for being in communication with an object, namely, directly or indirectly coupled to the object, but other embodiments of the present inventive concept can extend to various other configurations of the device, examples of which include but are not limited to labels, clips, rings, stickers, fasteners, coasters, and so on. Accordingly, embodiments of the article-identification-and-location device can have a variety of forms. Other coupling devices or elements for connecting, attaching, or coupling the tag body to a piece of luggage can be used without departing from the principles of the invention described herein, examples of which include clips or clamps disposed on an edge or on a rear side of the tag body. In some embodiments, such means can be irremovable from the luggage piece (e.g., sewn onto or into the luggage). In other embodiments, other such means can be designed to be removable. Some embodiments of the means for connecting, attaching, or coupling the tag body to a piece of luggage may not need the small opening in the tag body; in such embodiments the small opening can be dispensed with. In yet other embodiments, the coupling means is rigid. More specifically, the electronic device 102 does not have a freedom of motion independent to itself, but only the exact same motion as the object.

In addition to the electronic tag 102, the system 10 may include a communications network 106 such as a private network (i.e., intranet) 106 in communication with a public network (e.g., the Internet), a user mobile device 104 or alternatively a scanning station or kiosk or other user interface device in wireless or wired communication with the network 106. The electronic tag 102 may include an RF transceiver and antenna to exchange data locally in proximity with the mobile device 104 via a known communication protocol or electronic signal exchange. Accordingly, the mobile device 104 also has an RF transceiver capable of wireless communication In some embodiments, the mobile device 104 and tag can communicate via the network 106 when the mobile device 204 and electronic tag 102 are not in proximity. In general, the article-identification-and-location device includes the electronics that pairs with a customer (e.g., BLE (Bluetooth Low Energy) sensor in communication with the luggage owner via an application program or similar smartphone). In some embodiments, the interface to communicate weight includes a display image on an e-ink screen that is part of the device. In other embodiments, the interface includes one or more light emitting diodes (LEDs) or other visual, tactile, or audio indicators for communicating a calculated weight of the object, e.g., luggage, to which it is attached. For example, a yellow LED may be displayed when the object is calculated to be 0-10 lbs., a red LED may be displayed when the object is calculated to be 11-20 lbs., and a green LED may be displayed when the object is calculated to be greater than 20 lbs.

Figure 5B:
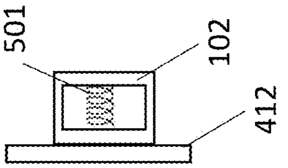
FIG. 5B is a cross-sectional side view of the electronic tag of FIG. 5A.
Figure 5A:
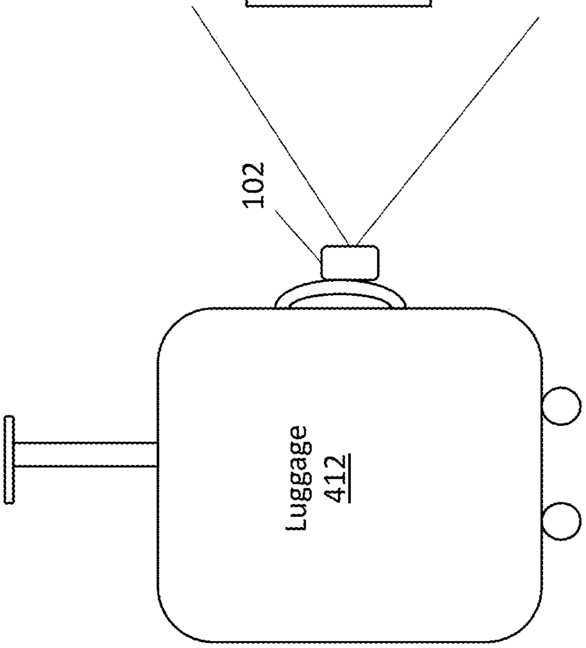
FIG. 5A is a perspective view of an electronic tag coupled to a piece of luggage, in accordance with some embodiments.

The electronic tag 102 when coupled to a piece of luggage 12 or the object can be used to determine the weight of the luggage 12 without the need of a weight scale. The electronic tag 102 can collect inertial information by sensing various movements from the luggage 12, for example, acceleration, impact, movement, and so on, caused by the luggage being moved, dropped, rolled or slide around enough times, or a user action such as jumping, shaking, rotation, etc. of the object to which the tag is attached or integrated with. This data can be combined with information provided by the mobile device 104, such as image data to determine a volume of the luggage 12 that can be used to assist calculating the weight of the luggage 12. The volume data can be used to help calculate mass by providing expected movement and impact calculations, comparing what that object's movement would be with zero mass (in this example, an empty suitcase) against the object's movement with positive mass (a full suitcase). The tag 102 on this luggage 12 can sense the movement and impact of the full luggage 12 and compare that movement and impact data against the empty luggage mass and determine the difference of the masses and use that information to calculate the mass of the full luggage 12. The mass would then be converted to weight by multiplying the mass by gravity or 9.8 Newtons/kg. The mobile device 104 can then send the weight data received from and calculated by the electronic tag 102 to a remote computer, for example, an airline system that processes the weight data. For the above mentioned embodiment, it is important to note that the force applied to both the empty and full luggage 12 is the same. Some techniques may be applied to ensure that the force applied in each of the empty and full states is the same. In some embodiments, the tag 102 has a mechanism such as a coil spring 501 (e.g., shown in FIGS. 5A and 5B) that applies an opposite force, for example, to push against the object 12. The coil spring 501 can be deployed in the tag 102 to create an impact. An algorithm can be implemented, i.e., stored in memory and executed by a special-purpose computer processor, that takes into consideration the exact force, the weight of the tag, which would be known, and computes the weight of the bag based on the tag sensor readings. In one embodiment of the weight calculations using a baseline with an empty luggage (object), the mass of the empty luggage is known. This can be obtained from the manufacturer's specifications or other means such as weighing once when purchased, etc.

In some embodiments, the tag device has an accelerometer and a force sensor. Some of the examples of force sensors are load cells for example, pneumatic load cells, capacitive load cells, strain gauge load cells, hydraulic load cells, etc. Other sensors may equally apply such as force-sensitive resistors, strain gauges, and so on. In all embodiments where the tag has both a force and an acceleration sensor, the process to determine weight can be accomplished by measuring the force and the responsive acceleration. In some embodiments, the tag 102 is rigidly attached to the object and the force is imparted to the object via the tag, or more specifically, a mechanism of the tag such as a spring that applies a force against the object. In other embodiments utilizing both an accelerometer and a force sensor, the weight is inferred over time as the object moves without any need for deliberately applying a force on the object. In some embodiments, when the force sensor is applied, the calculations involving an empty luggage is not required. Based on the case travel distance and the force sensor measurements and the average acceleration derived from the accelerometer (described herein with equations), a mass estimate can be calculated.

Figure 6:
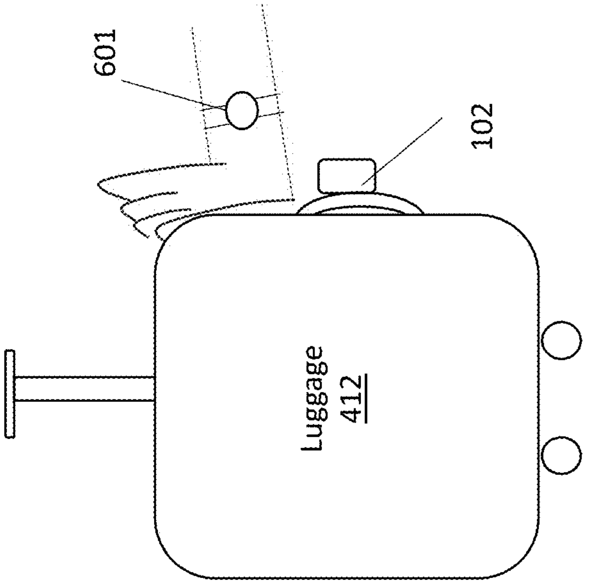
FIG. 6 is an illustration of a wearable smart device collecting sensor data for calculating a weight of luggage in motion, in accordance with some embodiments.

In other embodiments, additional information can be obtained through the mobile device or other mobile wearable smart devices such as smart watches that have integrated IMU sensors, for example, shown in FIG. 6. This provides additional measurements of impact and movement that combined with the measurements of the impact and movement of the object can be set into equations to solve for the weight of the object the tag is attached to. In these embodiments, the force applied may not be the same for empty vs full suitcase.

With further regard to embodiments where there is an IMU sensor only, since two different measurements are not taken, i.e., an empty suitcase and a full suitcase, and since this embodiment does not include a force sensor, additional data is required to calculate the object's weight. For example, as shown in FIG. 6, a smartwatch 601 is worn by a user applying a force to the object, i.e., pushing the suitcase 412. The object being pushed by the user wearing the smartwatch 601 can allow an impulse to be registered when the force is apply that is captured by the IMU sensor (not shown) on the smartwatch 601 when the object is pushed. In other embodiments, the smartwatch 601 may include other sensors that measure impact, movement, and so on. The impulse is measured from the perspective of the user wearing the smartwatch with the IMU. The tag 102 also has an IMU, and may independently register inertial data, which can be combined with the smartwatch's inertial data to determine the mass of the object. Here, the inertial data is of the motion that is in response to the force applied, referred to as external stimuli. In other embodiments, the tag 102 may register a combination of information from the watch 601 such as impact, movement, and so on as a consequence of a force applied by the user, e.g., wearer of the watch 601.

Figure 2:
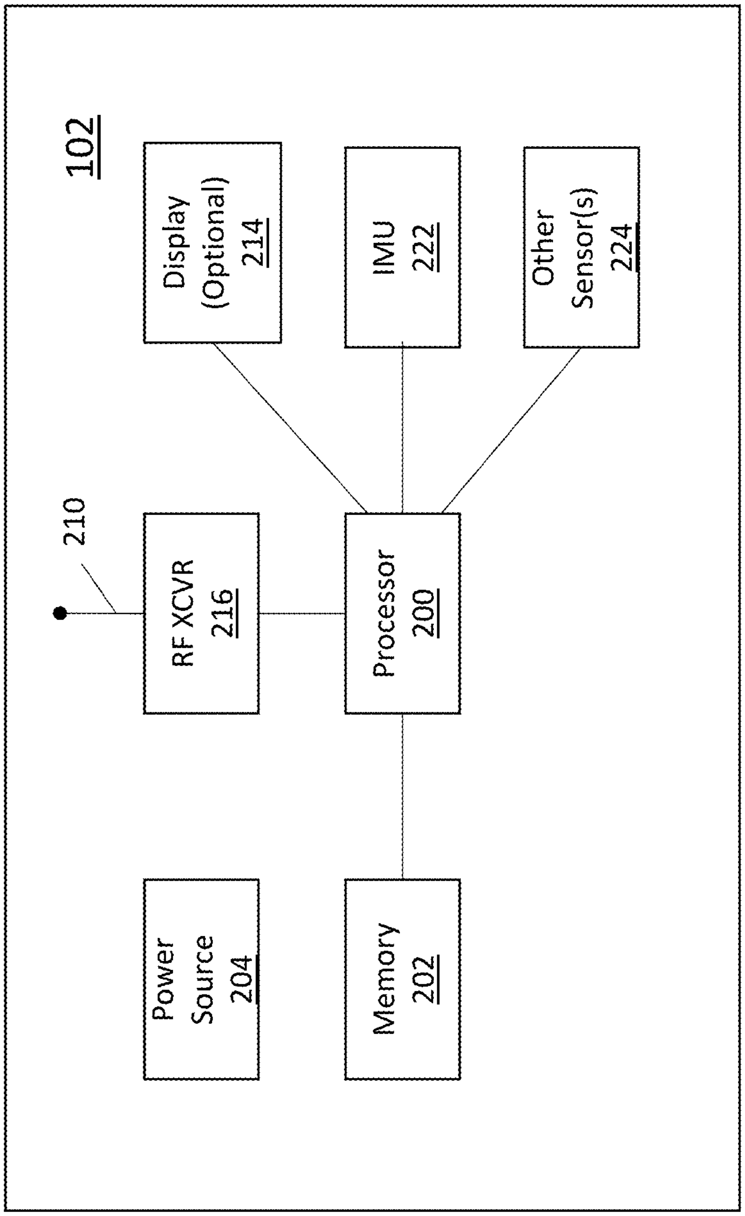
FIG. 2 shows a functional block diagram of an electronic tag, in accordance with some embodiments.

FIG. 2 shows a functional block diagram of an electronic tag 102, in accordance with some embodiments. The electronic tag 102 used to calculate the weight of an object to which the tag is coupled. The electronic tag 102 includes a processor or processing unit 200, memory 202, an RF receiver 216 (or, in another embodiment, an RF transceiver), and a power source 204 such as a battery. The tag 102 and the foregoing contents can be disposed on or within a substantially flat, thin tag body. In some embodiments, the tag body has a thickness ranging from 2 mm-10 cm. In other embodiments, the tag body has a thickness less than 2 mm or greater than 10 mm.

The memory 202 stores program code for calculating the weight of the object to which it is attached. Program code also, when executed, controls the various functionalities of the tag 102 as described herein. The memory 202 and the information and program code it stores can be physically distributed among the various components of the tag 102.

The RF receiver 216 has, in one embodiment, an antenna 210 for receiving radio signals. As previously described, the RF receiver 216 operates in accordance with a wireless communication technology, examples of which include, but are not limited to Bluetooth®, Bluetooth Low Energy (BLE), 802.XX, WLAN and ultra-wideband (UWB), and in one embodiment, may be part of an RF transceiver. In some embodiments, the tag 102 does not include an RF transceiver. Here, the tag 102 is a "standalone" device and calculates the weight of an object to which it is attached using only the sensor data, with no other information received from electronic devices external to the tag 102.

In some embodiments, the electronic tag 102 includes a plurality of sensors 224, including but not limited to a combination of gyroscopic sensors, altimeters, accelerometers, motion sensors, and force sensors, which measure force and acceleration for determining mass and weight, for example, in accordance with Newton's law of motion (force (F)=mass (m)*acceleration (a)). To determine the force (F) and acceleration (a) variables of this equation, the IMU sensor can be a 9-axis sensor comprising a combination of accelerometers, gyroscopes, and magnetometers to measure acceleration, orientation, angular rates, and/or other gravitational forces, and in particular, the momentum of the object's motion, the length of time of motion between two locations. In some embodiments, the optional altimeter 224 can be used to detect impact and movement, for example, when the object attached to the tag is dropped, to determine mass. This additional data can be used to calculate impact, i.e., the vertical length of the drop, the force at impact, etc. However, the altimeter in other embodiments is not required, where calculations are performed when comparing a simple push test to an empty suitcase's movement (on wheels) vs. a full suitcase's movement, which can be performed without an altimeter. In some embodiments, a force sensor can measure movement, inertia, or the like for collecting the data required to calculate the object's mass. The tag 102 may use these sensors 222, 224 alone or in combination with other sensors 224 to determine pressure, temperature, humidity, contact, or other environmental condition. For example, baseline information on the luggage may be received and processed such as a distance of movement when the luggage is empty, i.e., devoid of clothes, hygiene accessories, or other travel accessories. After the baseline information (a priori) is received, this information can be compared to the movement of the luggage when pushed when it includes the travel accessories, e.g., luggage is full. The comparison data can be used to determine mass and then weight.

It is well-known that in Newtonian mechanics, force and momentum are related by Newton's second law of motion, namely, $F=\Delta p/\Delta t$, wherein F is net external force, $\Delta p$ is the change in momentum, and $\Delta t$ is the change in time. In some applications, an altimeter of the tag attached to an object can measure a height from where the object can be dropped. Alternatively, the height may be predetermined. Measurements can be taken of the object in an empty state and a full state, for example, luggage filled with garments, shoes, etc. The impact velocity is independent of mass. Solving from the conservation of energy equation and neglecting drag forces caused by air resistance, velocity is calculated from: $v=\sqrt{2*g*h}$, where g is the acceleration of gravity and h is the drop height (can be collected from the altimeter). The impact acceleration is dependent on the pulse width of the force-time curve and must therefore take on an estimated value based on various material types. Impact acceleration $$a = \frac{\nabla v}{t_{pulse}}.$$

If we assume a perfect rebound, $$a = \frac{\nabla v}{t_{pulse}} = \frac{2*v}{t_{pulse}}.$$

The softer the impact surface, the smaller the resulting impact force as the soft surface slows down the impact, spreading out the pulse width over a longer period of time.

In some embodiments, the distance that the object moves can be established by the equation:

$$s = v*\Delta t + \frac{1}{2}a_{avg}(\Delta t)^2,$$

and $\Delta t$ and can be determined by the accelerometer (from start of the movement to stop), and initial speed v can be calculated as $v=a*t$. Here a is the accelerometer reads and t is the accelerometer first perk duration time. so, the average acceleration can be obtained $$a_{avg} = \frac{2*(s - v*(\Delta t))}{(\Delta t)^2}.$$

To obtain measurements, a force is first applied to an empty case with the initial mass m, traveled distance is $s_e$. If we can apply the same force to a loaded case, traveled distance is $s_f$.

The abovementioned equation $F=m*a$ is provided where a is the average acceleration and F is the force applied on the object. Assume the force applied are same. Then $m*a_0=(m+\Delta m)*a_1$ where $a_0$ and $a_1$ are the average acceleration based on the above equation. For simplification, we can assume the case runs at the same direction. So, the estimation of the loaded mass of the object $$\Delta m = m*\left(\frac{a_0}{a_1} - 1\right).$$

In other embodiments, when the object, e.g., luggage 12, having the tag 102 is dropped, the tag 102 integrated with or coupled to the object has an IMU, accelerometer, or the like and the shape, size, dimension, and/or type of object is predetermined or determined or known. Here, the equation: $F_{net}=M*a=M*g-F_d$ may apply. Here, a=acceleration, g=gravity, and $F_d$=drag force. $F_d=½\rho C_d A v^2$ where $\rho$ is air density, $C_d$ is the drag coefficient, A is the cross-sectional area, and v is the velocity. From these two equations, the following is used: $M=F_d/(g-a)=(½\rho c_d A v^2)/(g-a)$. These equations can be used to determine mass of the object. For example, $$\rho \text{ at sea level} = 1.225 \text{ kg/m}^2;$$

$$Cd \approx (\sim 0.47(\text{sphere}) \text{ or } \sim 01.05(\text{cube}) \text{ or } \sim 1.28(\text{flat plane})); \text{ and}$$

$$A = \pi r^2(\text{sphere}) \text{ or } 1 \times w(\text{plane})$$

Here, acceleration (a) can be provided by the tag's IMU and g can be subtracted (which is a known constant). The altimeter can be used to determine v, $v(t)=d_{altitude}/d(t)$. The IMU may be prone to noise which can be addressed by the foregoing. In addition, constants $c_d$ and A can be calibrated, i.e., changed for different objects.

The processor or processing unit 200 is electronic circuitry adapted to execute the instructions of the program code 206 that controls the operation of the article-identification-and-location device 102, for example, the processing of data received by the sensors and optionally, a third party mobile device such as a user's smartphone, and determining a weight of the object to the which the tag 102 is attached from the data.

In some embodiments, the tag 102 may include an optional display 214, which includes a variable, dynamic, and programmable screen for displaying a weight of an object to which the tag 102 is coupled. Embodiments of the display 214 include, but are not limited to, liquid crystal displays (LCD), organic light-emitting diode (OLED) displays, and electronic paper (i.e., electronic ink or e-ink) displays. In other embodiments where the tag 102 does not include a display, a weight result can be calculated by the tag 102 or remote computer, e.g., connected to the network 106, and displayed at a remote display (not shown), for example, an electronic display hanging from a wall at an airport where luggage is weighed using the tag 102 In some embodiments, the weight is displayed on an LCD or other display device of the mobile device 104, which receives the weight data via wireless transmission from the tag 102.

Figure 3:
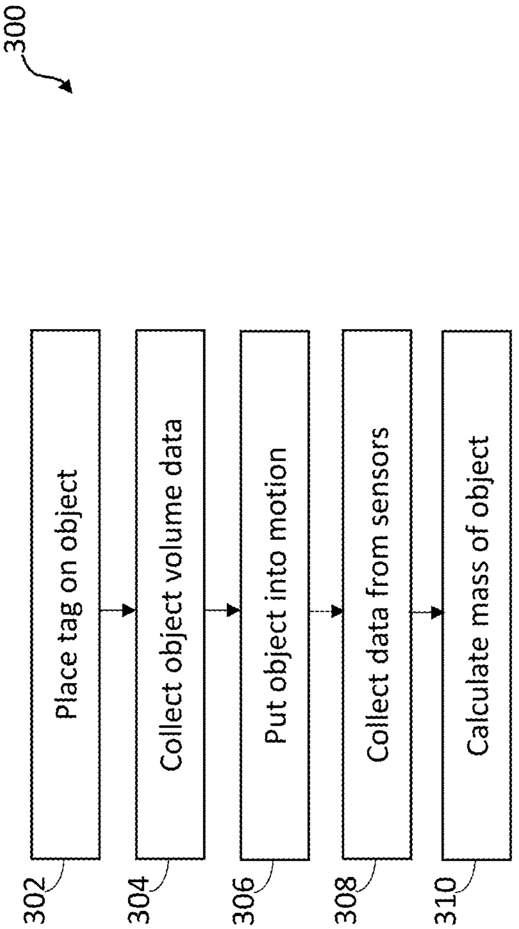
FIG. 3 is a flow diagram of a method for measuring weight of an object, in accordance with some embodiments.
Figure 4:
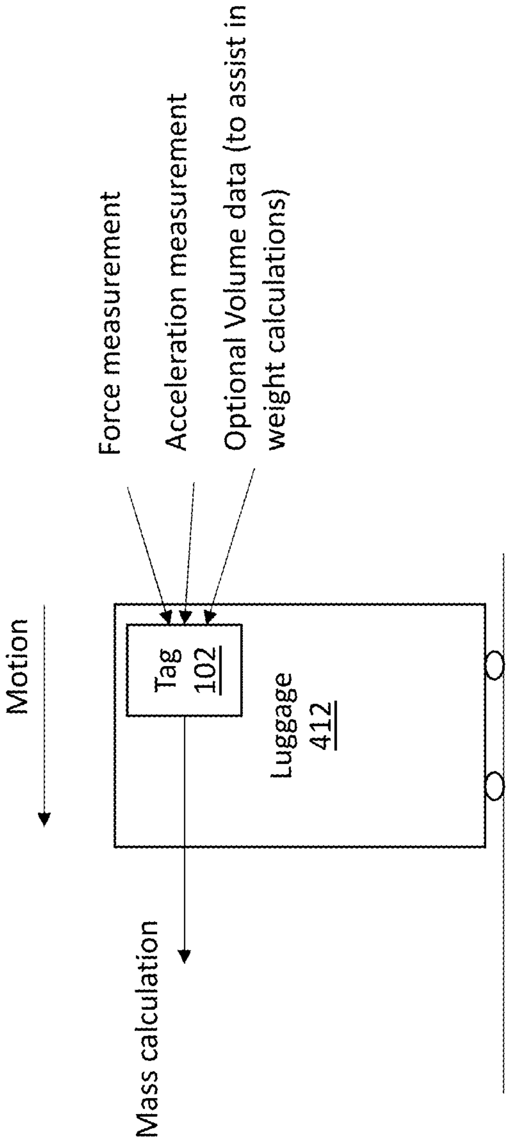
FIG. 4 is an illustration of an electronic tag collecting sensor data for calculating a weight of luggage in motion, in accordance with some embodiments.

FIG. 3 is a flow diagram of a method 300 for measuring weight of an object, in accordance with some embodiments. In describing the method 300, reference can be made to the elements of the system 10 of FIG. 1 or the electronic tag 102 of FIG. 2.

At block 302, the electronic tag 102 is attached, affixed, placed on, or integrated with the object of interest. In doing so, the tag 102 can collect motion-related data when the object is placed into motion.

At block 304, the object's volume is collected. In some embodiments, the mobile device 104 has a camera for capturing images of the object from different angles, or includes a depth camera, to capture images used to determine volume. The volume can be either determined using computer vision technology, deep neural network algorithms or SLAM algorithms. In some embodiments the dimensions and thus the volume can be obtained through the object's manufacturing specifications provided by the manufacturer. In other embodiments, the object is predetermined, and information about the object, including its volume and design (e.g., does it have wheels and how does it move when empty) may be stored in a database. Here, a barcode scanner or the mobile device can be used to scan a barcode, QR code, or the like on the luggage which automatically is used to identify the object, which in turn can be used to search for the volume in a database. In other embodiments, the combination of the previous two embodiments can be applied, for example, the mobile device capturing images to size directly or taking images to correlate or cross-reference against a database of known luggage sizing. According to one or more of the abovementioned embodiments, a user may capture one or more images of their luggage using the user's smartphone. Since most luggage sizing fits into a category, a combination of data can be collected for a size assessment provided by the image(s), brand and/or type of luggage collaboration to raise the likelihood of knowing what the luggage is and therefore, its size. Alternatively, the user can use the smartphone to scan a code on the luggage and that code would provide all the sizing information needed to determine its volume. Therefore, the smartphone can be used for taking images to size directly or taking images to correlate or cross-reference against a database of known luggage sizing.

At block 306, the object is placed in motion. For example, the object may be a piece of luggage having a set of wheels. By measuring the instantaneous acceleration by the sensor(s) of the tag when the same force is applied to an empty and full luggage, the mass of the luggage can be estimated, and thus the weight. Furthermore, the duration of movement and the distances can be computed or measured to cross validate the weight calculations.

In either case, at block 308, the sensors can sense changes of state and collect the movement-related information. The one or more sensors can collect real-time environmental data continuously or at specific intervals. In other embodiments, the sensors can measure the acceleration and heading, for example, when the luggage is first pushed by the user. Here, the luggage may include wheels and a handle and push the luggage along the floor and the sensors can capture data accordingly. A processor on the tag can monitor the sensor(s), in particular, the accelerometer and threshold for stationary and motion states, for example, to measure the time the object spent in motion, such as a luggage that slides along the floor after the initial push. The force(s) here can be captured by the force sensors.

At block 310, the mass of the object is calculated from the collected data, for example, force and acceleration, for determining mass and weight, for example, in accordance with Newton's law of motion (F=m*a). The weight (w) of the object can be calculated from the calculated mass, as is well-known from the equation w=m*g, where g=gravity.

In some embodiments, at manufacturing time of that object, the tag device is attached to the object and multiple readings of impact and movement at different weights of the Object (first the object is empty then there are weights added on to it) are gathered. Then using these data points we can fit a curve or use machine learning algorithms to estimate the weight of the object based on the IMU readings from any impact. In this embodiment, the impact does not need to be applied on empty object by the end user, just once with the full object weight, for example a fully packed luggage.

As will be appreciated by one skilled in the art, aspects of the present invention may be embodied as a system, method, and apparatus. Thus, some aspects of the present invention may be embodied entirely in hardware, entirely in software (including, but not limited to, firmware, program code, resident software, microcode), or in a combination of hardware and software.

Having described above several aspects of at least one embodiment, it is to be appreciated that various alterations, modifications, and improvements will readily occur to those skilled in the art. Such alterations, modifications, and improvements are intended to be part of this disclosure and are intended to be within the scope of the invention. Embodiments of the methods and apparatuses discussed herein are not limited in application to the details of construction and the arrangement of components set forth in the foregoing description or illustrated in the accompanying drawings. The methods and apparatuses are capable of implementation in other embodiments and of being practiced or of being carried out in various ways. Examples of specific implementations are provided herein for illustrative purposes only and are not intended to be limiting. References to "one embodiment" or "an embodiment" or "another embodiment" means that a feature, structure, or characteristic described in connection with the embodiment is included in at least one embodiment described herein. References to one embodiment within the specification do not necessarily all refer to the same embodiment. The features illustrated or described in connection with one exemplary embodiment may be combined with the features of other embodiments.

Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all the described terms. Any references to front and back, left and right, top and bottom, upper and lower, inner, and outer, interior, and exterior, and vertical and horizontal are intended for convenience of description, not to limit the described systems and methods or their components to any one positional or spatial orientation. Accordingly, the foregoing description and drawings are by way of example only, and the scope of the invention should be determined from proper construction of the appended claims, and their equivalents.

What is claimed is:

1. A luggage tag comprising:

a computer processor;

a memory in communication with the computer processor, the memory storing inertial data and program code for calculating a weight of luggage in communication with the luggage tag; and at least one sensor that captures the inertial data of the motion of the luggage in response to an external stimuli and outputs the inertial data to the memory, wherein the computer processor executes the program code to determine a mass of the luggage from the captured inertial data in accordance with Newton's law of motion.

2. The luggage tag of claim 1, wherein, the computer processor uses the at least one sensor to calculate the weight by comparing movement data of the luggage when it is empty and movement data when the luggage includes items in the luggage.

3. The luggage tag of claim 1, wherein the at least one sensor is an Inertial Measurement Unit (IMU).

4. The luggage tag of claim 1, wherein the at least one sensor includes an accelerometer and a force sensor, and wherein the mass is determined by measuring the acceleration and a force in response to external stimuli.

5. The luggage tag of claim 4, wherein the at least one sensor further includes a gyroscope.

6. The luggage tag of claim 1, further comprising a mechanism that imparts a force on the luggage attached to it.

7. The luggage tag of claim 1, wherein at a manufacturing time of the luggage, the tag is attached to the luggage or embedded in the luggage and multiple readings of impact and movement at different weights of the luggage, wherein the data from the multiple readings is used to estimate the weight of the object based on the sensor readings from any impact.

8. The luggage tag of claim 1, further comprising a display for displaying the weight of the luggage.

9. The luggage tag of claim 1, further comprising an RF transceiver for wirelessly transmitting the weight of the luggage to a mobile device.

10. The luggage tag of claim 1, further comprising a coupling device configured to rigidly attach the luggage tag to the luggage such that the luggage tag does not have freedom of motion independent of the luggage.

11. The luggage tag of claim 1, wherein the processor receives and processes volume data of the luggage from a mobile device, and wherein the volume data is used to assist in calculating the weight of the luggage.

12. An electronic tag comprising:

a computer processor;

a memory in communication with the computer processor, the memory storing inertial data and program code for calculating a weight of an object in communication with the electronic tag; and at least one sensor that captures inertial data in response to a motion of the object and outputs the inertial data to the memory, wherein the computer processor executes the program code to determine a mass of the object from the captured inertial data in accordance with Newton's law of motion.

13. The electronic tag of claim 12, wherein the electronic tag is a wearable mobile device and the object is a human, and wherein the computer processor determines a weight of the human.

14. The electronic tag of claim 12, wherein the object has rigidity-related features.

15. The electronic tag of claim 12, wherein the object is a piece of luggage.

16. The electronic tag of claim 12, further comprising a mechanism that imparts a force on the object attached to it.

17. The electronic tag of claim 12, wherein the electronic tag is coupled to the object or embedded in the object.

18. The electronic tag of claim 12, further comprising an RF transceiver for wirelessly transmitting the weight of the object to a mobile device.

19. A weight measuring system, comprising:

a wearable smart device comprising at least one sensor that captures impact and movement data of an object, the wearable smart device positioned on a user applying a force to the object; and a tag coupled to the object for registering the impact and movement as a consequence of the force applied by the user to the object, wherein the wearable smart device and the tag each comprise an Inertial Measurement Unit (IMU), and wherein inertial data from the wearable smart device is combined with inertial data from the tag to determine a mass of the object in accordance with Newton's law of motion, and wherein a weight of the object is calculated from the mass.

20. The weight measuring system of claim 19, wherein the tag further comprises a computer processor and a memory storing program code for calculating the weight of the object.

* * * * *